United States Patent
Kondo et al.

(10) Patent No.: US 9,371,762 B2
(45) Date of Patent: Jun. 21, 2016

(54) CATALYST PROTECTION DEVICE AND CATALYST PROTECTION METHOD FOR INTERNAL COMBUSTION ENGINE

(71) Applicants: Shinya Kondo, Gotenba (JP); Yasuyuki Takama, Gotenba (JP); Koji Aso, Susono (JP)

(72) Inventors: Shinya Kondo, Gotenba (JP); Yasuyuki Takama, Gotenba (JP); Koji Aso, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/404,090

(22) PCT Filed: May 30, 2013

(86) PCT No.: PCT/IB2013/001202
§ 371 (c)(1),
(2) Date: Nov. 26, 2014

(87) PCT Pub. No.: WO2013/179132
PCT Pub. Date: Dec. 5, 2013

(65) Prior Publication Data
US 2015/0128567 A1    May 14, 2015

(30) Foreign Application Priority Data
Jun. 1, 2012 (JP) ................. 2012-126029

(51) Int. Cl.
*F01N 3/00* (2006.01)
*F01N 3/20* (2006.01)
(Continued)

(52) U.S. Cl.
CPC ............ *F01N 3/2033* (2013.01); *F01N 3/2066* (2013.01); *F01N 11/002* (2013.01); *F01N 2550/02* (2013.01); *F01N 2900/1602* (2013.01);
(Continued)

(58) Field of Classification Search
CPC .............................. F01N 3/2066; F01N 3/2033
USPC ........................................................... 60/274
See application file for complete search history.

(56) References Cited

U.S. PATENT DOCUMENTS

| 5,414,994 A | 5/1995 | Cullen et al. |
| 2004/0206068 A1 | 10/2004 | Michelini |

(Continued)

FOREIGN PATENT DOCUMENTS

| DE | 19648427 A1 | 6/1998 |
| JP | 07-166918 A | 6/1995 |

(Continued)

*Primary Examiner* — Jason Shanske
(74) *Attorney, Agent, or Firm* — Kenyon & Kenyon LLP

(57) ABSTRACT

A catalyst protection device includes: a catalyst provided in an exhaust system of an internal combustion engine and purifying exhaust gas; a bed temperature acquisition unit acquiring a current bed temperature of the catalyst; a base increase value calculation unit calculating a base increase value that is a base value of an increase value of a fuel injection amount injected by a fuel injection valve included in the internal combustion engine in order to cool the catalyst when the current bed temperature exceeds a predetermined determination value; a compensator acquiring a corrected increase value by correcting the base increase value using a reduction coefficient that is calculated by incorporating a value of a target bed temperature set to a value strictly lower than the determination value; and an injection amount increasing unit selecting any one of the base increase value and the corrected increase value. When catalyst protection is required, the fuel increase value is therefore optimized to reasonable values, while not being reduced too much.

12 Claims, 14 Drawing Sheets

(51) Int. Cl.
  *F01N 11/00* (2006.01)
  *F02D 41/02* (2006.01)
(52) U.S. Cl.
  CPC . *F02D 2041/0265* (2013.01); *F02D 2200/0802* (2013.01); *F02D 2200/0804* (2013.01); *Y02T 10/47* (2013.01)

(56) References Cited

U.S. PATENT DOCUMENTS

| | | | |
|---|---|---|---|
| 2006/0016180 A1* | 1/2006 | Tomita | F01N 3/0253 60/297 |
| 2007/0256407 A1* | 11/2007 | Reuter | F01N 3/0253 60/286 |
| 2009/0314267 A1* | 12/2009 | Kawai | F02D 41/0002 123/674 |
| 2011/0056190 A1* | 3/2011 | Nakata | F01N 3/0807 60/286 |
| 2011/0126517 A1* | 6/2011 | Miyoshi | F01N 3/2066 60/274 |
| 2011/0251779 A1 | 10/2011 | Kachi et al. | |
| 2012/0014410 A1 | 1/2012 | Kachi et al. | |

FOREIGN PATENT DOCUMENTS

| | | |
|---|---|---|
| JP | 2003-343242 A | 12/2003 |
| JP | 2011-220214 A | 11/2011 |
| JP | 2012-21441 A | 2/2012 |
| JP | 2013-249793 A | 12/2013 |
| WO | 03/029634 A1 | 4/2003 |
| WO | 2013/179131 A1 | 12/2013 |

* cited by examiner

FIG. 12

| | INSTANTANEOUS OT DETERMINATION FLAG | FRONT END PORTION OT DETERMINATION FLAG | CENTER PORTION OT DETERMINATION FLAG | RETARDATION OT INCREASE AMOUNT | FRONT END PORTION OT INCREASE AMOUNT | CENTER PORTION OT INCREASE AMOUNT |
|---|---|---|---|---|---|---|
| (A) | ON | ON | ON | BASE INCREASE VALUE | CORRECTED INCREASE VALUE | CORRECTED INCREASE VALUE |
| (B) | OFF | ON | ON | CORRECTED INCREASE VALUE | CORRECTED INCREASE VALUE | CORRECTED INCREASE VALUE |
| (C) | ON | ON | OFF | BASE INCREASE VALUE | CORRECTED INCREASE VALUE | NO INCREASE |
| (D) | OFF | ON | OFF | CORRECTED INCREASE VALUE | CORRECTED INCREASE VALUE | NO INCREASE |
| (E) | ON | OFF | ON | BASE INCREASE VALUE | BASE INCREASE VALUE | NO INCREASE |
| (F) | ON | OFF | OFF | BASE INCREASE VALUE | BASE INCREASE VALUE | NO INCREASE |
| (G) | OFF | OFF | ON | NO INCREASE | | |

CATALYST PROTECTION DEVICE AND CATALYST PROTECTION METHOD FOR INTERNAL COMBUSTION ENGINE

CROSS-REFERENCE TO RELATED APPLICATIONS

This is a national phase application based on the PCT International Patent Application No. PCT/IB2013/001202 filed May 30, 2013, claiming priority to Japanese Patent Application No. 2012-126029 filed Jun. 1, 2012, the entire contents of both of which are incorporated herein by reference.

BACKGROUND OF THE INVENTION

1. Field of the Invention

The invention relates to a catalyst protection device and catalyst protection method for an internal combustion engine.

2. Description of Related Art

Some internal combustion engines (engines) include an exhaust purification catalyst (hereinafter, simply referred to as catalyst where appropriate) for purifying exhaust gas. However, when the catalyst is excessively heated by high-temperature exhaust gas; or the like, the purification capacity of the catalyst may decrease. In order to keep the high purification capacity of the catalyst, a technique for cooling the catalyst by decreasing the temperature of exhaust gas with the use of the heat of vaporization of fuel through an increase in fuel injection amount may be used. The increase in the amount of injected fuel in this case is termed over temperature protection (OT) increase. The amount of injected fuel that is increased through the OT increase is termed OT increase value.

Japanese Patent Application Publication No. 2011-220214 (JP 2011-220214 A) describes a technique for preventing an overheat of a catalyst by calculating an OT increase value when a current temperature that is calculated on the basis of an operating state of an internal combustion engine exceeds an OT determination temperature. An excessive OT increase may lead to an increase, in emissions of hydrocarbons (HC) and carbon monoxide (CO). In addition, an excessive OT increase is disadvantageous in terms of fuel economy. Therefore, in JP 2011-220214 A, a correction coefficient is calculated, and fuel is injected on the basis of the OT increase value corrected by the correction coefficient. The OT determination temperature is incorporated in calculation of the correction coefficient.

However, in JP 2011-220214 A, the OT determination temperature is used in calculation of the correction coefficient, so the OT increase value is excessively reduced. As a result, there is a possibility that the catalyst is not sufficiently cooled.

SUMMARY OF THE INVENTION

The invention provides a catalyst protection device and a catalyst protection method that appropriately reduce an OT increase value within a range in which an overheat of the catalyst is avoidable.

A first aspect of the invention provides a catalyst protection device for an internal combustion engine. The catalyst protection device includes: a catalyst that is provided in an exhaust system of the internal combustion engine and that purifies exhaust gas; a bed temperature acquisition unit configured to acquire a current bed temperature of the catalyst on the basis of a steady bed temperature that is a temperature of the catalyst in the case where an operating state of the internal combustion engine is a steady state; and an injection amount increasing unit configured to increase an amount of fuel injected in the internal combustion engine when the current bed temperature exceeds a predetermined determination value, wherein the injection amount increasing unit is configured to increase the amount of injected fuel, by a first increase value that is obtained on the basis of (i) a first base increase value, which is obtained on the basis of the operating state of the internal combustion engine, and (ii) a correction coefficient, which is obtained on the basis of the current bed temperature and a target bed temperature lower than the predetermined determination value.

When the correction coefficient is calculated, the target bed temperature set to a value lower than the predetermined determination value is employed. Thus, it is possible to appropriately reduce the base increase value, by avoiding an excessive reduction in fuel injection amount.

In the catalyst protection device according to the first aspect of the invention, when the internal combustion engine is subjected to retardation control for retarding fuel ignition timing, the injection amount increasing unit may be configured to increase the amount of injected fuel; by sum of the first increase value and a second increase value that is obtained on the basis of the correction coefficient and a second base increase value that is obtained on the basis of a retardation amount through the retardation control.

In the catalyst protection device according to the first aspect of the invention, if it is determined that protection of the catalyst is required when the injection amount increasing unit increases the amount of injected fuel by a sum of the first increase value and the second increase value, the injection amount increasing unit may select the second base increase value as the second increase value.

A value corresponding to the operating state of the internal combustion engine may be employed as the base increase value. For example, a value that is calculated on the basis of a rotation speed of the internal combustion engine and an intake air amount (load) may be employed as the base increase value. When the internal combustion engine is being subjected to ignition timing retardation control, a retardation increase for increasing the amount of injected fuel may be performed in order to suppress an increase in catalyst temperature due to ignition timing retardation control. It is desirable to make a correction for the retardation increase using the correction coefficient. However, if instantaneous increase determination is made, that is, if it is determined that protection of the catalyst is required, a sufficient fuel injection amount is ensured by avoiding a reduction in retardation increase in order to give a priority to protection of the catalyst.

In the catalyst protection device according to the first aspect of the invention, the target bed temperature may be a bed temperature to which the bed temperature converges at the time when an increase in the amount of injected fuel by the first base increase value is continued.

The catalyst protection device according to the first aspect of the invention, may further includes a steady bed temperature acquisition unit configured to acquire a steady bed temperature that is a temperature of the catalyst in the case where an operating state of the internal combustion engine is a steady state. The catalyst protection device, the correction coefficient may be the ratio of a difference between the current bed temperature and the target bed temperature to a difference between the steady bed temperature and the target bed temperature.

It is possible to determine an appropriate increase value by calculating an increase value that is introduced in order to decrease the bed temperature by 1° C.

In the catalyst protection device according to the first aspect of the invention, the injection amount increasing unit may be configured to increase the amount of the amount of injected fuel, by the first increase value that is calculated for each of a plurality of regions of the catalyst in the exhaust gas flow direction.

In the catalyst protection device according to the first aspect of the invention, on the basis of determination as to whether an increase in fuel injection amount is required for a preset reference region and determination as to whether, an increase in fuel injection amount is required for a region upstream of the reference region in the exhaust gas flow direction among the plurality of regions, the injection amount increasing unit may be configured to add an increase value for the reference region to an increase value for the region upstream of the reference region in the exhaust gas flow direction.

In the catalyst protection device according to the first aspect of the invention, when it is determined that an increase in fuel injection amount is required for both a preset reference region and an adjacent region upstream of the reference region in the exhaust gas flow direction among the plurality of regions, the injection amount increasing unit may be configured to add an increase value for the reference region to an increase value for the adjacent region upstream of the reference region in the exhaust gas flow direction.

In the catalyst protection device according to the first aspect of the invention, when the bed temperature acquisition unit sets a determination value for each of the plurality of regions and then calculates an increase value for a preset reference region among the plurality of regions and an increase value for a region upstream of the reference region in the exhaust gas flow direction among the plurality of regions, based on the determination values respectively set for the regions, the bed temperature acquisition unit may acquire the bed temperature in the reference region on the basis of the determination value set for the region upstream of the reference region in the exhaust gas flow direction.

In the catalyst protection device according to the first aspect of the invention, the injection amount increasing unit may set a value, as a determination value for the reference region which is one of the plurality of regions, smaller than a determination value set for a region upstream of a preset reference region in the exhaust gas flow direction, and may determine for each region whether an increase in fuel injection amount is required by comparing a current bed temperature for each of the regions with the determination value set for each of the regions.

A second aspect of the invention provides a catalyst protection method for an internal combustion engine. The catalyst protection method includes: acquiring a current bed temperature of a catalyst which purifies exhaust gas; and, when the current bed temperature exceeds a predetermined determination value, increasing an amount of injected fuel, by an increase value that is obtained on the basis of (i) a base increase value, which is obtained on the basis of the operating state of the internal combustion engine, and (ii) a correction coefficient, which is obtained on the basis of the current bed temperature and a target bed temperature lower than a predetermined determination value.

With the catalyst protection device and the catalyst protection method according to the aspects of the invention, it is possible to appropriately reduce an OT increase value within a range in which an overheat of the catalyst is avoidable.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 12 is a table that illustrates a correspondence between a state of each OT determination flag and an OT increase measure.

DETAILED DESCRIPTION OF EMBODIMENTS

An embodiment of the invention will be described with reference to the accompanying drawings.

Figure 1:
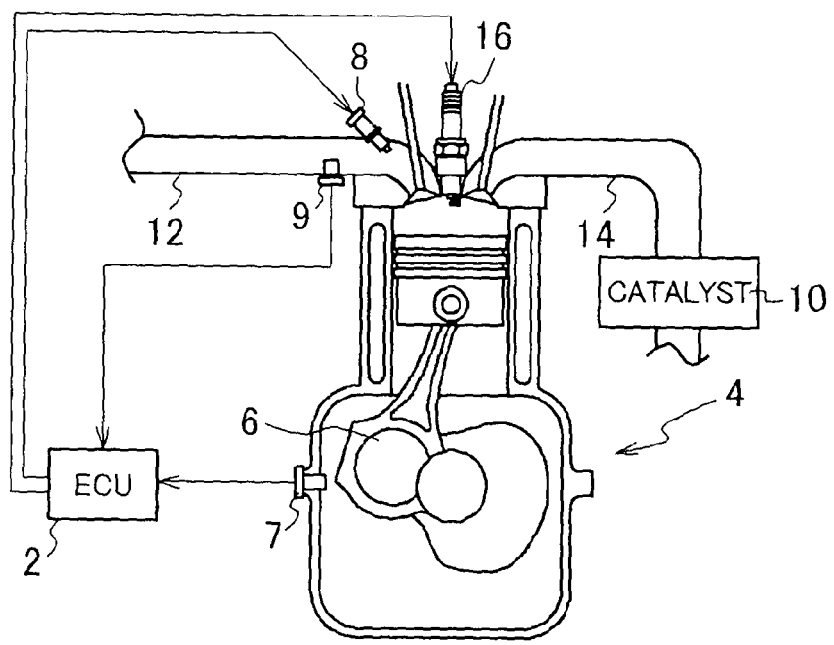
FIG. 1 is a schematic view that illustrates an engine to which a catalyst protection device according to an embodiment is applied.

First, the configuration of a catalyst protection device for an internal combustion engine (hereinafter, simply referred to as catalyst protection device) will be described. FIG. 1 is a schematic view that illustrates the internal combustion engine to which the catalyst protection device according to the embodiment is applied.

As shown in FIG. 1, the engine includes an engine control unit (ECU) 2, an engine body 4, a crankshaft 6, a crank angle sensor 7, a fuel injection valve 8, an intake air sensor 9, an exhaust purification catalyst (hereinafter, simply referred to as, catalyst where appropriate) 10, an intake pipe 12, an exhaust pipe 14 and an ignition plug 16.

The fuel injection valve 8, the intake pipe 12, the exhaust pipe 14 and the ignition plug 16 are provided for the engine body 4. The crank angle sensor 7 is provided at a cylinder of the engine body 4, and detects the crank angle of the crankshaft 6. The fuel injection valve 8 and the intake air sensor 9 are provided at the intake pipe 12. The fuel injection valve 8 injects fuel. The intake air sensor 9 detects an intake air amount that is taken into the engine body 4 through the intake pipe 12. The catalyst 10 is provided in an exhaust system.

Specifically, the catalyst 10 is provided at the exhaust pipe 14, and purifies exhaust gas that is exhausted from the engine body 4. The ECU 2 acquires a data of a crank angle and an intake air amount. The crank angle is detected by the crank angle sensor 7. The intake air amount is detected by the intake air sensor 9. The ECU 2 controls fuel injected by the fuel injection valve 8 and ignition performed by the ignition plug 16.

Figure 2:
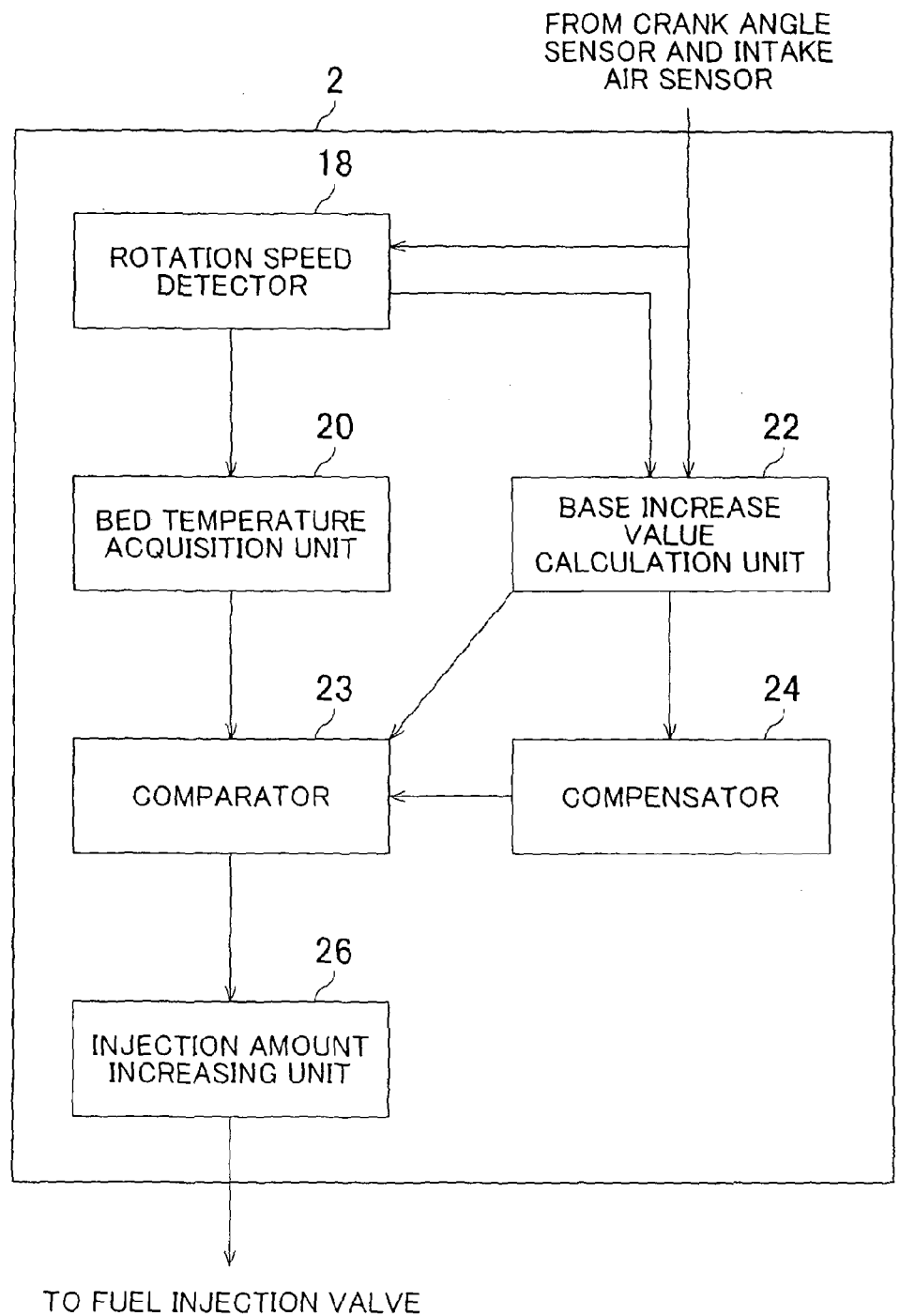
FIG. 2 is a functional block diagram that illustrates the catalyst protection device according to the embodiment.

FIG. 2 is a functional block diagram that illustrates a fuel injection control device according to the embodiment. As shown in FIG. 2, the ECU 2 functions as a rotation speed detector 18, a bed temperature acquisition unit 20, a base increase value calculation unit 22, a comparator 23, a compensator 24 and an injection amount increasing unit 26. The bed temperature acquisition unit 20 functions as a bed temperature acquisition unit and a steady bed temperature acquisition unit. Specifically, the bed temperature acquisition unit 20 acquires a current bed temperature of the catalyst 10, and acquires a steady bed temperature. The bed temperature acquisition unit 20 acquires the steady bed temperature on the basis of an operating condition of the internal combustion engine. The steady bed temperature is the temperature of the catalyst 10 in the case where the operating state of the internal combustion engine is a steady state. The ECU 2 holds a predetermined determination value (threshold value for determining catalyst temperature), that is, the ECU 2 holds an OT determination temperature. The ECU 2 compares a current bed temperature with the OT determination temperature, and determines whether an OT increase is required. The ECU 2 also holds a target bed temperature. The target bed temperature will be described in detail later.

Figure 3:
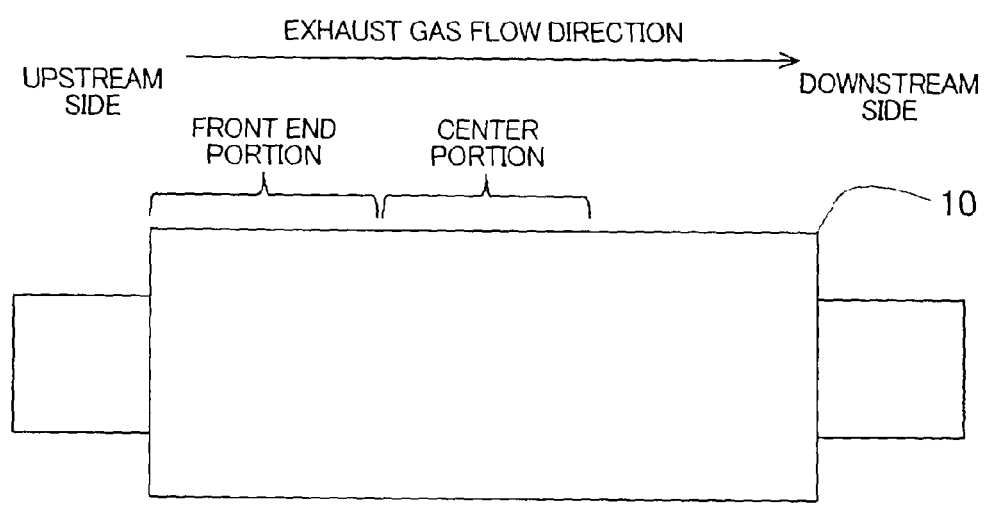
FIG. 3 is a view that illustrates a front end portion and a center portion in a catalyst.

As shown in FIG. 3, the catalyst 10 is distributed in an exhaust gas flow direction. That is, the catalyst 10 is distributed into a plurality of regions in the exhaust gas flow direction. Specifically, the catalyst 10 is distributed into a front end portion and a center portion. The front end portion is located at an upstream side in the exhaust gas flow direction. The center portion is adjacent to the front end portion and is located downstream of the front end portion. In addition, the front end portion and the center portion need not be strictly partitioned by a partition wall, or the like. The front end portion, and the center portion just need to be identified as distributed regions. The injection amount increasing unit 26 increases the injection amount in consideration of an OT increase value. The OT increase value is calculated for each of regions into which the catalyst 10 is distributed in the exhaust gas flow direction.

The rotation speed detector 18 acquires a crank angle, and detects a rotation speed on the basis of the crank angle. The crank angle is detected by the crank angle sensor 7. The bed temperature acquisition unit 20 acquires a steady bed temperature of the catalyst 10 and a current bed temperature of the catalyst 10 on the basis of the intake air amount and the rotation speed of the internal combustion engine. The intake air amount is detected by the intake air sensor 9. The rotation speed is detected by the rotation speed detector 18. The steady bed temperature is a temperature to which the bed temperature of the catalyst 10 converges (convergence temperature) in the case where the internal combustion engine is operated at a certain intake air amount and a certain rotation speed. That is, the steady bed temperature is a temperature to which the bed temperature of the catalyst 10 converges in the case where the operating state is a steady state. The current bed temperature is, for example, obtained through smoothing on the basis of the convergence temperature (steady bed temperature).

Figure 11:
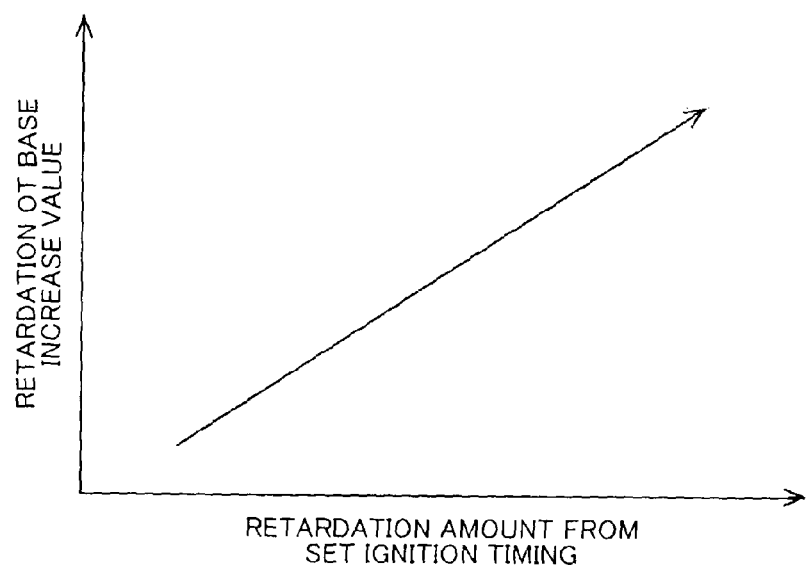
FIG. 11 is an example of a map for calculating a retardation base increase value.

The base increase value calculation unit 22 calculates a base increase value on the basis of the intake air amount and the rotation speed. The base increase value is a base amount of fuel that should be injected from the fuel injection valve 8. The base increase value is, for example, acquired in accordance with a map shown in FIG. 5. That is, the base increase value is acquired on the basis of an engine rotation speed and a load. The base increase value may be acquired for each of the front end portion and the center portion of the catalyst 10 shown in FIG. 3. Furthermore, as shown in FIG. 11, it is possible to acquire a base increase value (retardation base increase value) corresponding to retardation control. The comparator 23 compares the steady bed temperature, the current bed temperature and the OT determination temperature with one another, and determines a magnitude correlation among those temperatures. In addition, the comparator 23 determines magnitude correlations in steps that are included in the flowchart shown in FIG. 4.

The compensator 24 corrects the base increase value on the basis of the steady bed temperature and the current bed temperature. The steady bed temperature and the current bed temperature are acquired by the bed temperature acquisition unit 20. The base increase value is calculated by the base increase value calculation unit 22. Specifically, the compensator 24 corrects the base increase value using a correction coefficient, and acquires a corrected increase value. The target bed temperature is set to a value lower than the OT determination temperature (determination value). The correction coefficient is calculated in consideration of the target bed temperature.

The injection amount increasing unit 26 selects any one of the base increase value and the corrected increase value as a final OT increase value. The amount of fuel increased by the OT increase value determined by the injection amount increasing unit 26 is injected from the fuel injection valve. That is, the total of the OT increase value and a injection amount before the OT increase is injected from the fuel injection valve. The details will be described later.

Figure 4A:
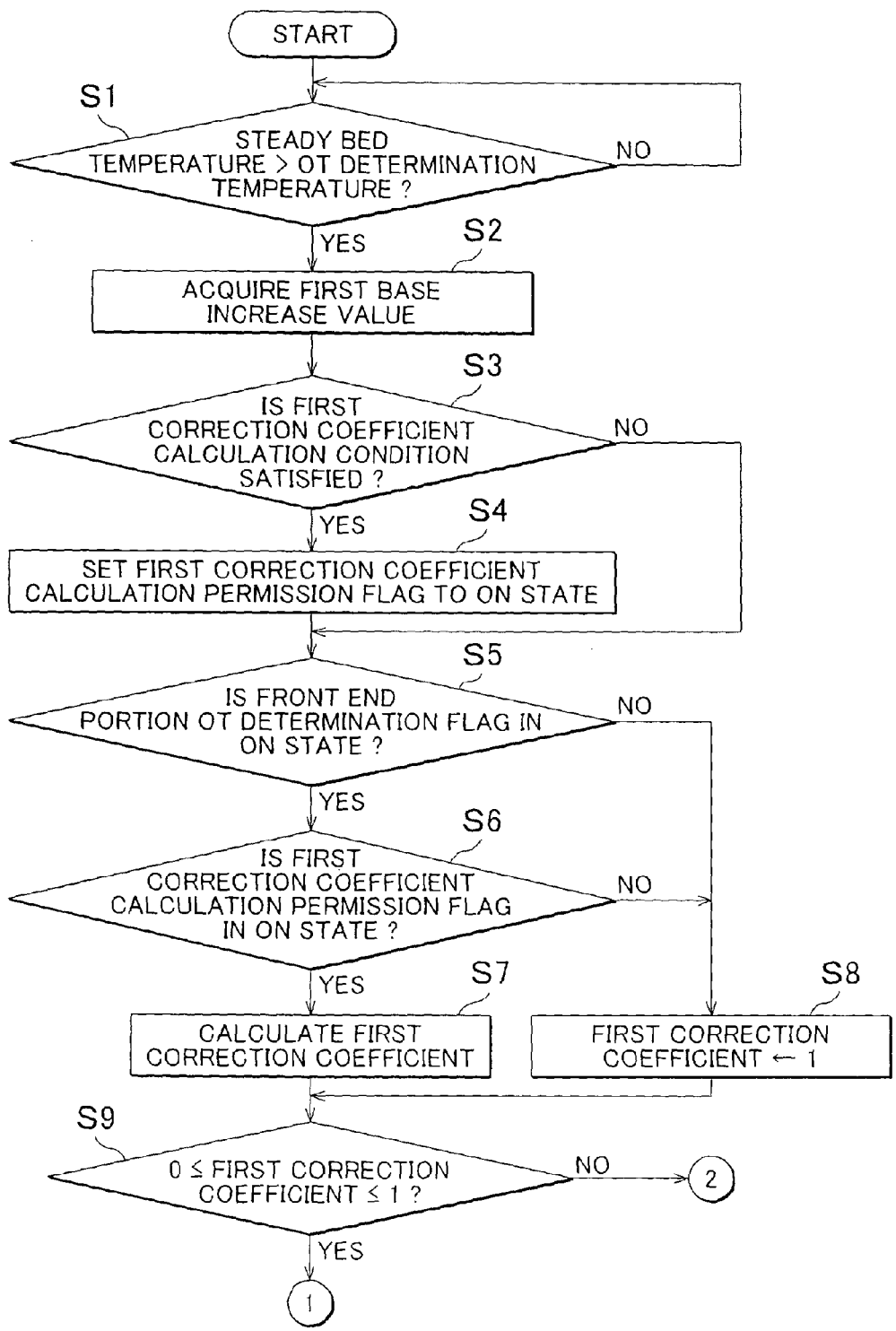
FIG. 4A is a flowchart that shows an example of control over the catalyst protection device according to the embodiment.
Figure 4B:
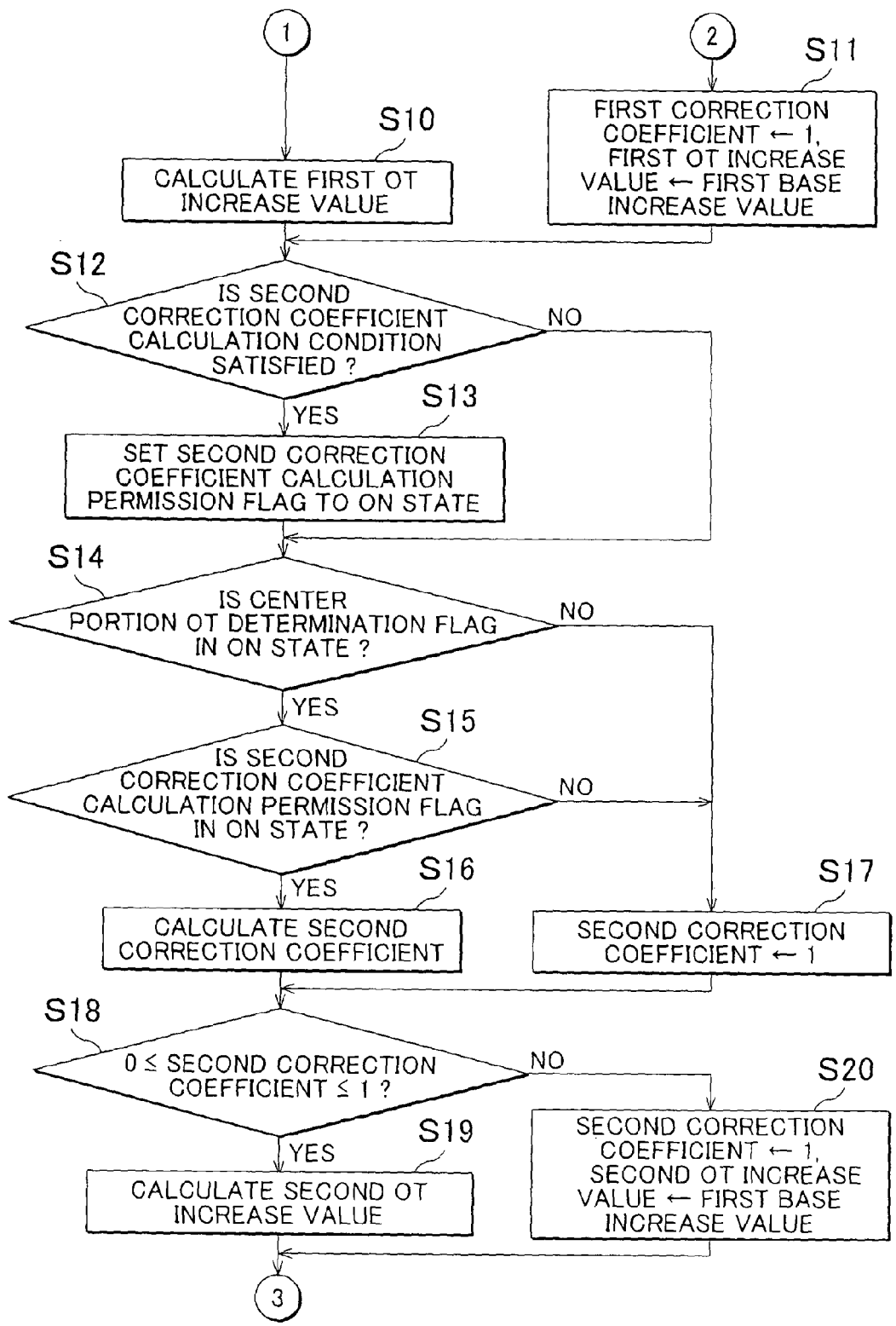
FIG. 4B is a flowchart that shows an example of control over the catalyst protection device according to the embodiment.
Figure 5:
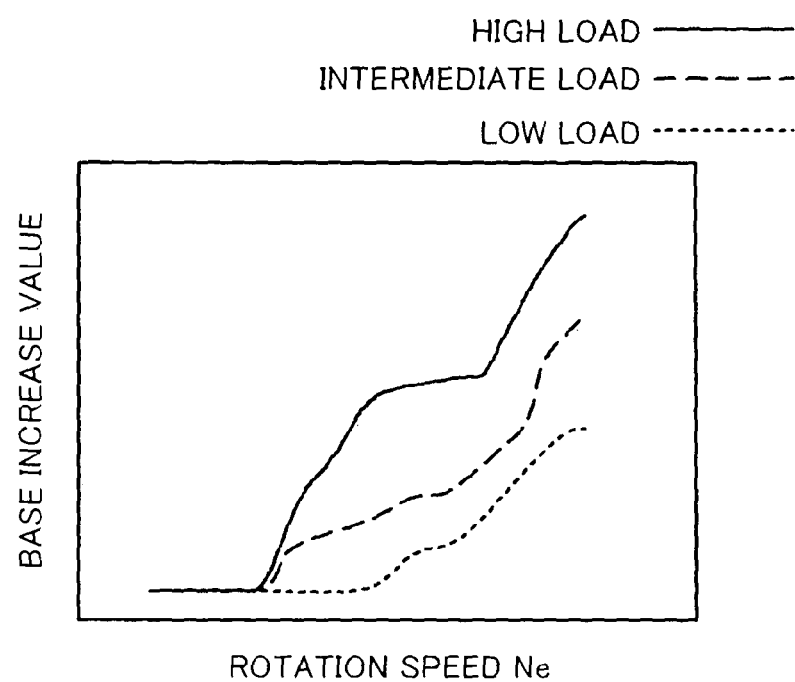
FIG. 5 is a view that shows an example of a map by which a base increase value is calculated on the basis of an engine rotation speed and an engine load.

Next, an example of control over the catalyst protection device according to the embodiment will be described with reference to the flowchart shown in FIG. 4A. Control over the catalyst protection device is mainly executed by the ECU 2.

Figure 6:
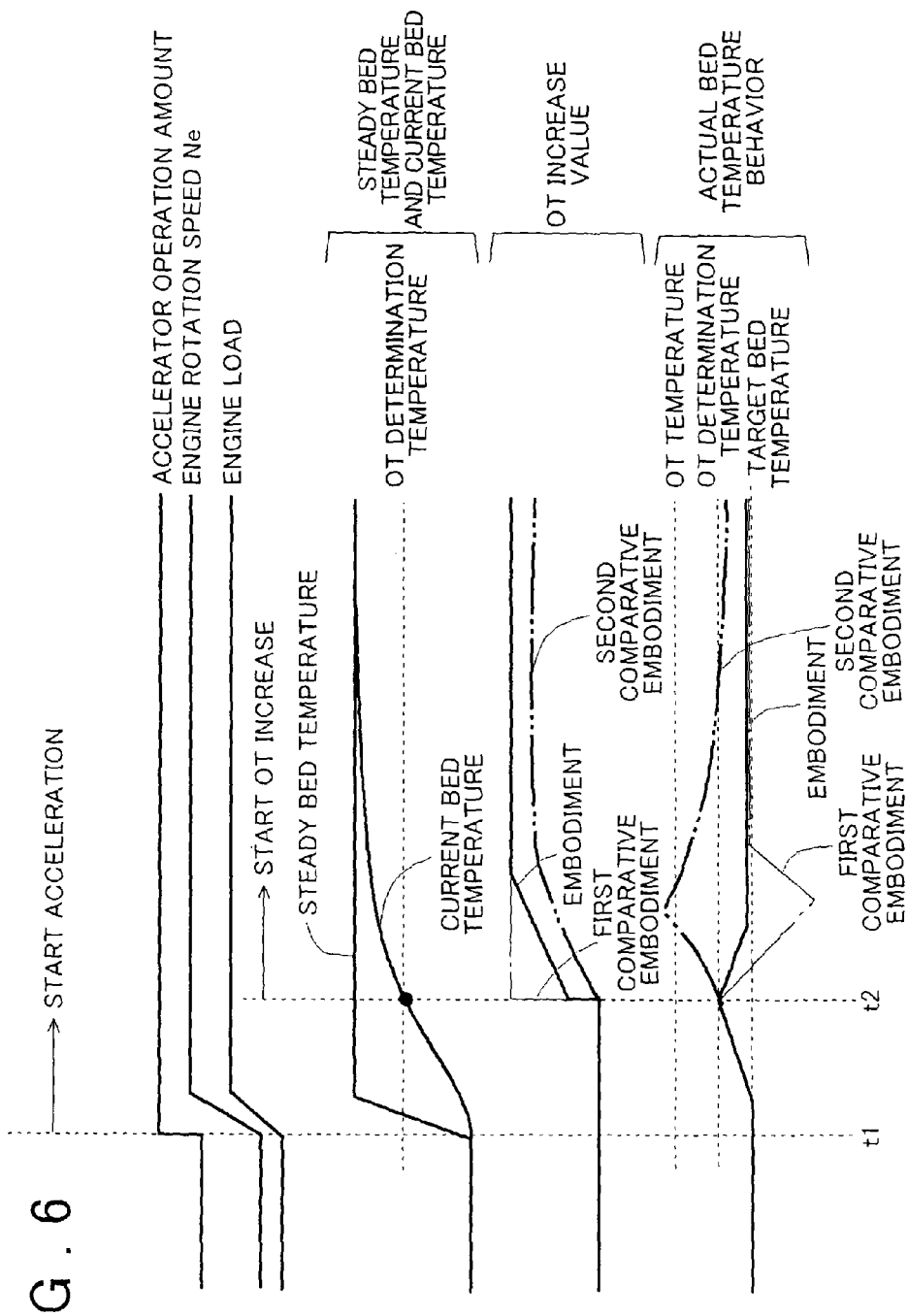
FIG. 6 is a time chart that shows an example of temporal variations in values in the catalyst protection device according to the embodiment.

Initially, in step S1, it is determined whether the steady bed temperature is higher than the OT determination temperature. This is because a state where the above condition is not satisfied is a state where OT increase control is not required. The process of step S1 is repeated until affirmative determination is made. The convergence temperature (steady bed temperature) rises in response to an increase in accelerator operation amount at time t1 as shown in FIG. 6. The current bed temperature approaches the steady bed temperature with a time lag.

When affirmative determination is made in step S1, the process proceeds to step S2. In step S2, a first base increase value is acquired. The first base increase value is acquired from the map illustrated in FIG. 5. That is, the first base increase value is acquired on the basis of the engine rotation speed and the engine load. Here, the first base increase value is a base increase value that takes into consideration the state of the front end portion of the catalyst 10 shown in FIG. 3.

In step S3 subsequent to step S2, it is determined whether a first correction coefficient calculation condition is satisfied. Here, a first correction coefficient is obtained on the basis of the current bed temperature and the target bed temperature. Specifically, the first correction coefficient is calculated by the following mathematical expression 1 for obtaining the ratio of a difference between the current bed temperature and the target bed temperature to a difference between the steady bed temperature and the target bed temperature. The first correction coefficient is a coefficient for reducing the first base increase value.

First correction coefficient=((Current bed temperature)−(Target bed temperature))/((Steady bed temperature)−(Target bed temperature))  Expression 1

The target bed temperature is set to a value lower than the OT determination temperature, and means a bed temperature to which the bed temperature converges at the time when an increase in the amount of injected fuel by the first base increase value is continued. In this way, the first correction coefficient is a coefficient obtained in consideration of the influence of introduction of the first base increase value. Thus, an excessive reduction in the base increase value is suppressed, and an excessive-temperature state is avoided.

In step S3, it is determined whether the first correction coefficient calculation condition is satisfied. Specifically, it is determined whether a calculation permission condition that ((Current bed temperature)−(Target Temperature))≥0 and ((Steady bed temperature)−(Target temperature))>0 is satisfied. This is because, when the calculation permission condition is not satisfied, a calculated value is not appropriate as a value for reducing the base increase value. When affirmative determination is made in step S3, the process proceeds to step S4. In step S4, a first correction coefficient calculation permission flag is set to an on state. Then, the process proceeds to step S5. On the other hand, when negative determination is made in step S3, the process skips step. S4 and proceeds to step S5.

In step S5, it is determined whether a front end portion OT determination flag is in an on state. That is, it is determined whether the current bed temperature shown in FIG. 6 has increased and has exceeded the OT determination temperature. As shown in FIG. 6, at time t2, the current bed temperature exceeds the OT determination temperature. Therefore, the OT determination flag is set to an on state at time t2. When affirmative determination is made in step S5, the process proceeds to step S6. When negative determination is made in step S5, the process proceeds to step S8. Step S8 will be described later.

In step S6, it is, determined whether first correction coefficient calculation permission flag is in an on state. When the process has passed through step S4, affirmative determination is made. When affirmative determination is made in step S6, the process proceeds to step S7. In step S7, the first correction coefficient is calculated by the expression 1.

On the other hand, when negative determination is made in step S5 or step S6, the process proceeds to step S8. In step S8, "1" is employed as the first correction coefficient. This is a measure that is employed for the purpose of fail safe for an effective increase value. For example, when the first correction coefficient is larger than 1 due to various factors, the base increase value is further increased, and an excessive increase is performed. In order to avoid this, situation, "1" is employed as the first correction coefficient. When "1" is employed as the first correction coefficient, the base increase value is directly output. Thus, the catalyst is cooled, and the catalyst is protected.

In step S9 subsequent to step S7 and step S8, it is determined whether the condition (0≤first correction coefficient≤1) is satisfied. When affirmative determination is made in step S9, the process proceeds to step S10 with reference to the flowchart shown in FIG. 4B. In step S10, a first OT increase value is calculated by the expression 2. The first OT increase value corresponds to the corrected increase value.

(First OT increase value)=(First correction coefficient)×(First base increase value)  Expression 2

On the other hand, when the first correction coefficient falls outside the range (0≤first correction coefficient≤1) and negative determination is made in step S9, the process proceeds to step S11. In step S11, "1" is set as the first correction coefficient. As a result, the first base increase value is calculated as the first OT increase value. For example, even when an accurate value is not calculated due to a control system of the device, an injection amount of the base increase value is ensured. Thus, the catalyst is protected.

Through the process to step S11, calculation of the OT increase value for the front end portion of the catalyst 10 has been completed. The process to step S11 may be regarded as control over the catalyst protection device. That is, in the present embodiment, the process of cooling the center portion of the catalyst 10 and the process of cooling following retardation control are subsequently executed; however, a final OT increase value may be determined representatively for the front end portion and then fuel may be injected.

Figure 7:
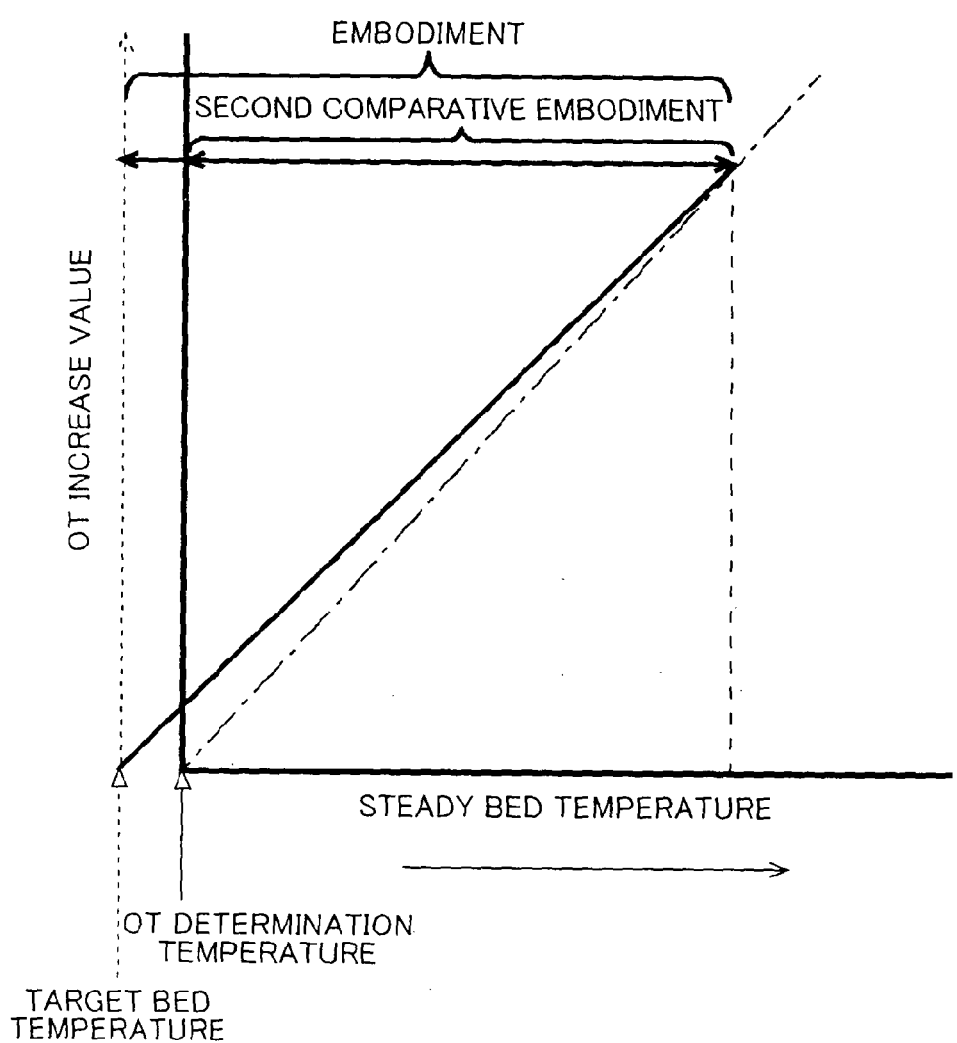
FIG. 7 is a view that illustrates the correlation between a convergence temperature and an OT increase value in the embodiment together with a comparative embodiment.
Figure 8:
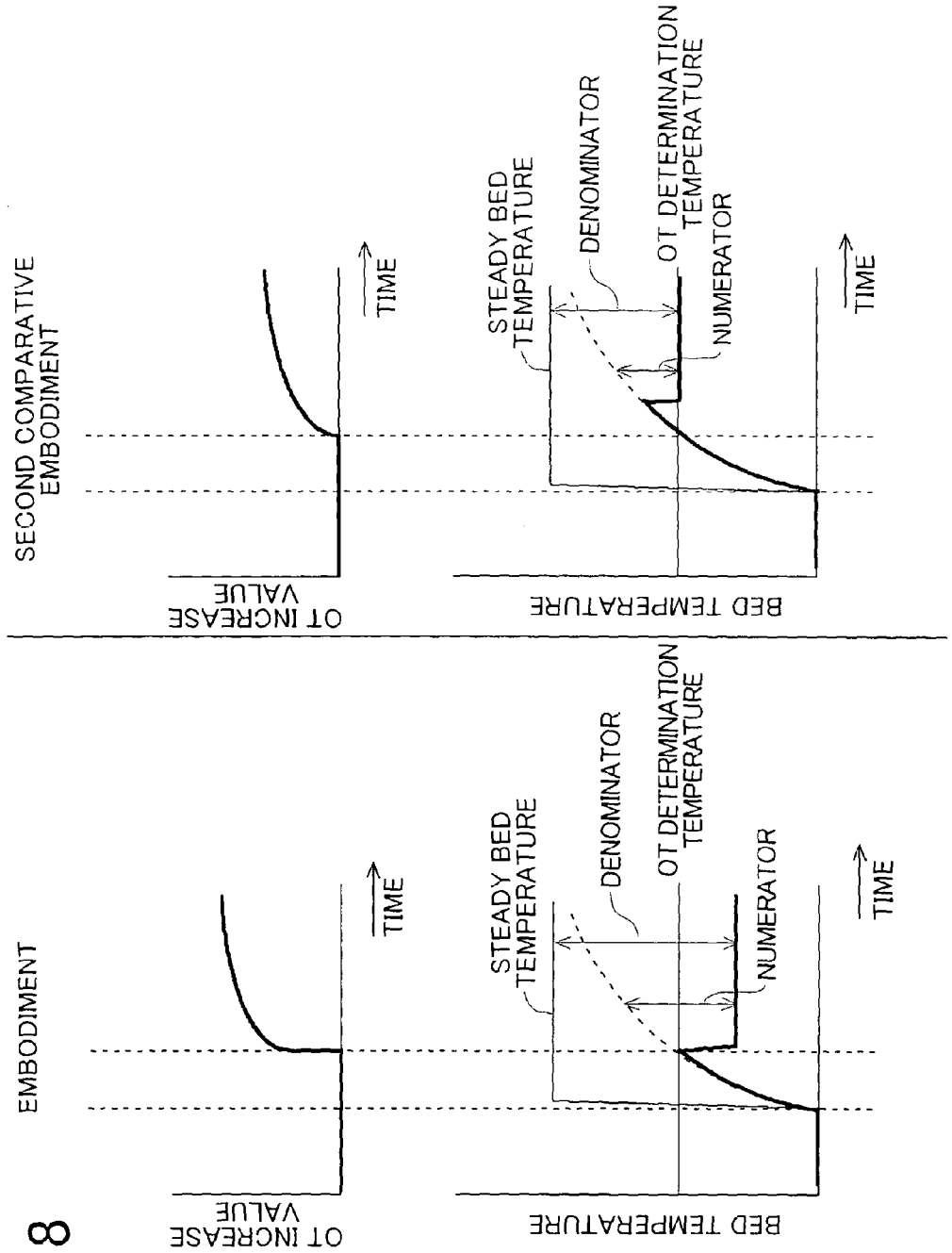
FIG. 8 is a view that illustrates the correlation between an OT increase value and a change in bed temperature in the embodiment together with a comparative embodiment.

Here, the behavior of temperature in the case where fuel is injected using the first OT increase value calculated in step S10 as the final OT increase value will be described with reference to FIG. 6 to FIG. 8 together with comparative embodiments.

In FIG. 6, in a first comparative embodiment, fuel is injected by constantly using the base increase value. That is, no measure to reduce the base increase value is taken. In a second comparative embodiment, a correction coefficient is calculated using the expression 3.

Correction coefficient=((Current bed temperature)−(OT determination temperature))/((Steady bed temperature)−(OT determination temperature))  Expression 3

In the first comparative embodiment, fuel is injected by constantly using the base increase value, so the injection amount may become excessive. As a result, an actual temperature may decrease more than necessary, and the amount of emission of CO may increase.

In the second comparative embodiment, the amount of reduction from the base increase value may become excessive, an increase in injection amount may be insufficient, and the bed temperature may rise over an OT temperature. This phenomenon will be described with reference to FIG. 7 and FIG. 8. In the second comparative embodiment, the correction coefficient that is calculated by the expression 3 is used. The OT determination temperature is incorporated into the expression 3. Therefore, as shown in FIG. 7, cooling is insufficient, particularly, in an initial stage of increasing control, in which the temperature of the catalyst is low. As shown in FIG. 8, in the embodiment, immediately after the bed temperature has reached the OT determination temperature, the OT increase value rises substantially vertically. In contrast to this, in the second comparative embodiment, the OT increase value gradually increases, so the bed temperature may rise over the OT determination temperature.

In this way, in the catalyst protection device according to the embodiment, the target bed temperature lower than the OT determination temperature is used at the time when the correction coefficient is calculated, so it is possible to calculate an appropriate OT increase value.

Figure 9:
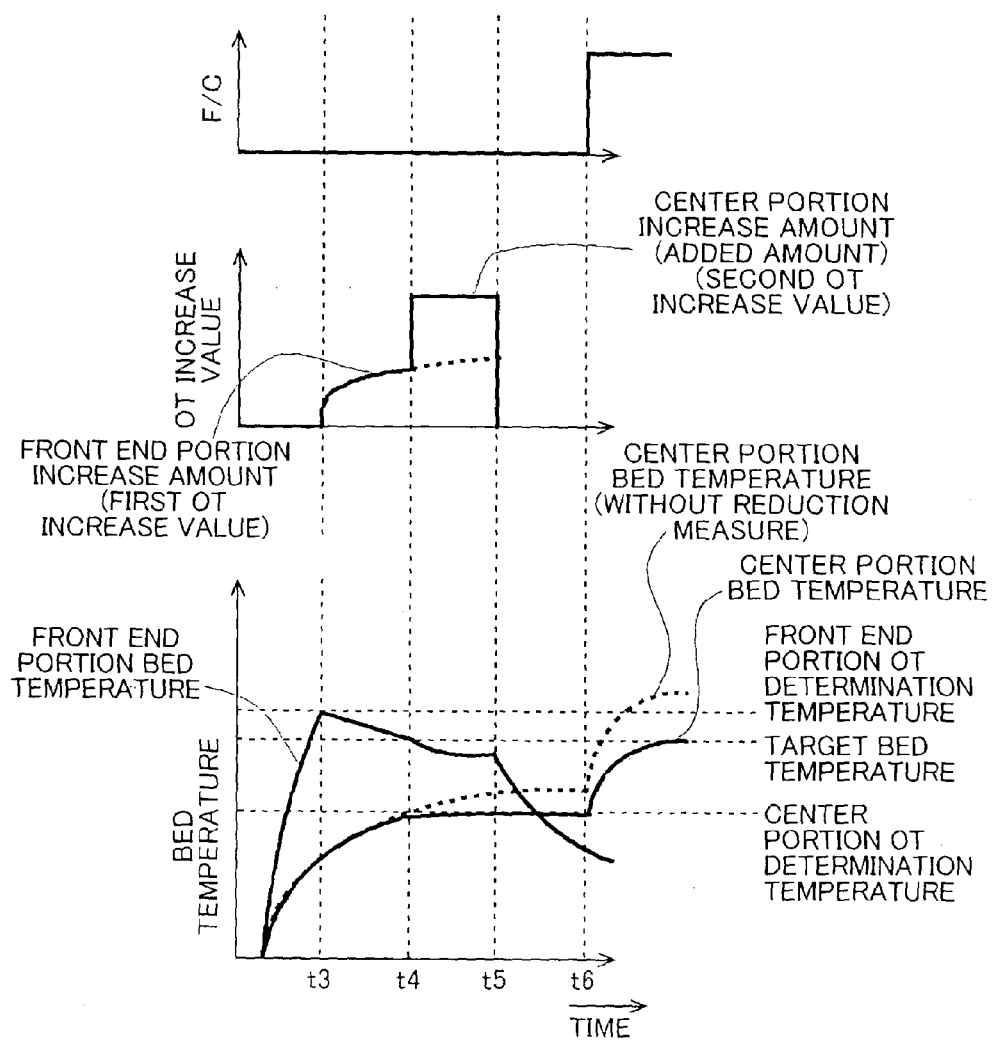
FIG. 9 is a view that illustrates the correlation among an OT increase, value, a change in front end portion bed temperature and a change in center portion bed temperature.

Subsequently, the process from step S12 will be described. Through the process from step S12 to step S20, the OT increase value for the center portion of the catalyst 10 is calculated. When the OT increase value for the center portion is calculated as well, the first base increase value is used as in the case where the OT increase value for the front end portion is calculated. As shown in FIG. 9, the amount of increase for the center portion of the catalyst 10 (second OT increase value) is finally added to the first OT increase value (step S30). The second OT increase value is, for example, calculated as a value for a steep rise in temperature in the case where fuel cut (F/C) control is executed.

In step S12, it is determined whether a second correction coefficient calculation condition is satisfied. Here, a second correction coefficient is calculated by the following expression 4. The second correction coefficient is a coefficient for reducing the first base increase value.

$$\text{Second correction coefficient} = ((\text{Center portion current bed temperature}) - (\text{Center portion OT determination temperature}))/((\text{Steady bed temperature}) - (\text{Target bed temperature})) \quad \text{Expression 4}$$

The target bed temperature is a value similar to that when the first correction coefficient is calculated, and is set to a value lower than the OT determination temperature. The target bed temperature means a bed temperature to which the bed temperature converges at the time when an increase in fuel injection by the first base increase value is continued. In this way, the second correction coefficient is a coefficient obtained in consideration of the influence of introduction of the first base increase value. Thus, an excessive reduction in the base increase value is suppressed. Therefore, an excessive-temperature state of the catalyst is avoided.

Figure 10:
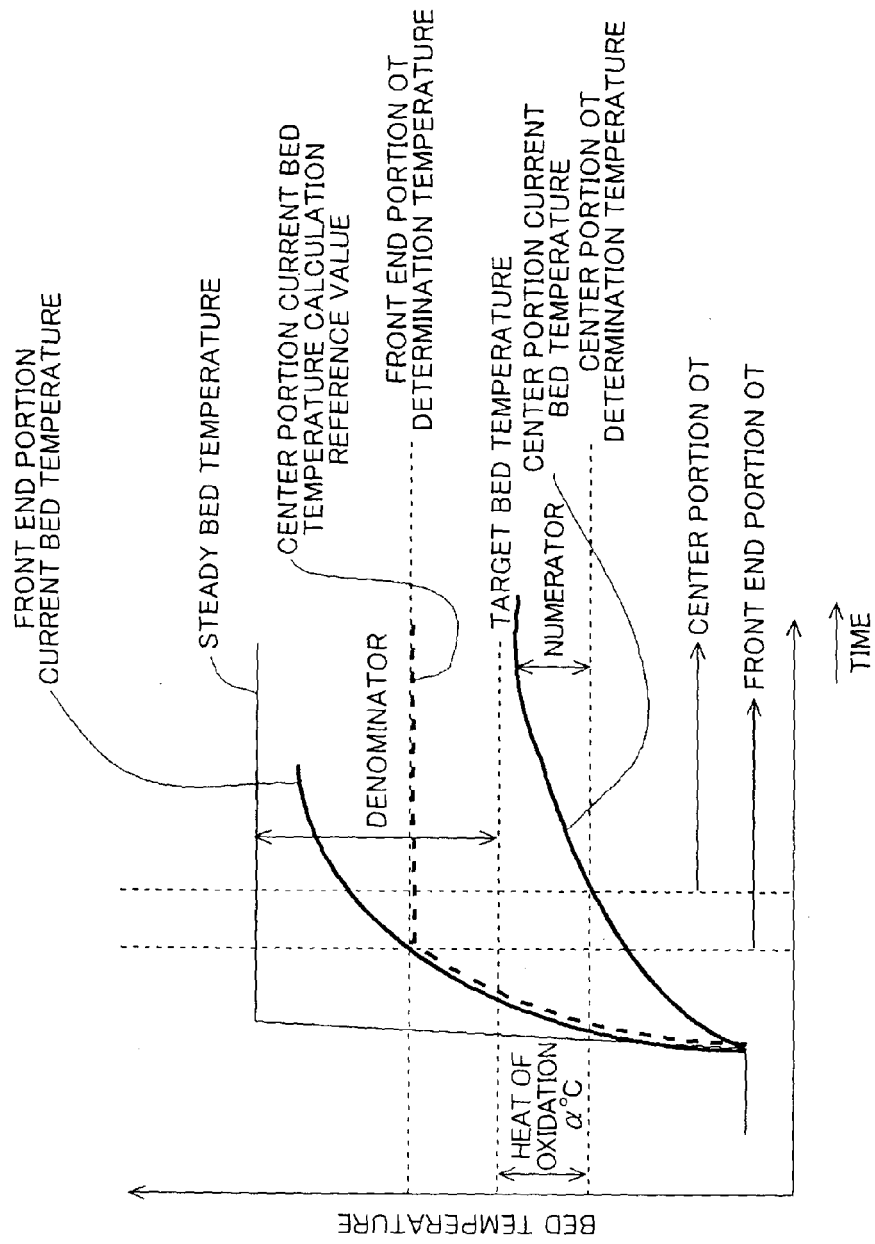
FIG. 10 is a graph that illustrates calculation of a correction coefficient for the center portion of the catalyst.

In order to obtain the center portion current bed temperature, a center portion current bed temperature calculation reference value shown in FIG. 10 is calculated. That is, a reference value for calculating the current bed temperature at the center portion is calculated. The center portion current bed temperature calculation reference value is obtained by modifying the current bed temperature at the front end portion. Specifically, the center portion current bed temperature calculation reference value is obtained by limiting the current bed temperature to the OT determination temperature for the front end portion after the current bed temperature at the front end portion has reached the OT determination temperature. That is, the center portion current bed temperature calculation reference value is obtained by keeping the current bed temperature at the OT determination temperature after the current bed temperature at the front end portion has reached the OT determination temperature. The center portion current bed temperature is obtained by smoothing the center portion current bed temperature calculation reference value. The reason why the center portion current bed temperature is defined in this way is as follows. That is, when OT determination is made at the front end portion and then OT increase for the front end portion is performed, the current bed temperature of the front end portion decreases from the OT determination temperature toward the target bed temperature. However, it is difficult to acquire at how much rate the actual bed temperature converges toward the target bed temperature after the OT increase is performed. Then, during an increase in injection amount is being performed, the center portion current bed temperature is defined by utilizing a value smoothed toward the OT determination temperature that is a high-temperature-side limit condition, and that is not permitted to be exceeded.

The center portion OT determination temperature is set to a value lower by the heat of oxidation α° C. of a catalyst material than the target bed temperature. At the center portion of the catalyst 10, for example, the bed temperature increases when F/C is performed. The OT determination temperature is set in expectation of the increase in bed temperature.

In step S12, it is determined whether the above second correction coefficient calculation condition is satisfied. Specifically, it is determined whether the calculation permission condition that ((Center portion current bed temperature)−(Center portion OT determination temperature))≥0 and ((Steady bed temperature)−(Target bed temperature))>0 is satisfied. This is because, when the calculation permission condition is not satisfied, a calculated value is not appropriate as a value for reducing the base increase value. When affirmative determination is made in step S12, the process proceeds to step S13, and, in step S13, a second correction coefficient calculation permission flag is set to an on state. Then, the process proceeds to step S14. On the other hand, when negative determination is made in step S12, the process skips step S13 and proceeds to step S14.

In step S14, it is determined whether the center portion OT determination flag is in an on state. That is, it is determined whether the center portion current bed temperature shown in FIG. 10 has exceeded the OT determination temperature. When affirmative determination is made in step S14, the process proceeds to step S15. When negative determination is made in step S14, the process proceeds to step S17. Step S17 will be described later.

In step S15, it is determined whether the second correction coefficient calculation permission flag is in an on state. When the process has passed through step S13, affirmative determination is made. When affirmative determination is made in step S15, the process proceeds to step S16. In step S16, the second correction coefficient is calculated by the expression 4.

On the other hand, when negative determination is made in step S14 or step S15, the process proceeds to step S17. In step S17, "1" is employed as the second correction coefficient. This is a measure that is employed for the purpose of fail safe for an effective increase value. For example, when the second correction coefficient is larger than 1 due to various factors, the base increase value is further increased, and an excessive increase is performed. In order to avoid such an excessive increase, "1" is employed as the second correction coefficient. When "1" is employed as the second correction coefficient, the base increase value is directly output. Thus, the catalyst is cooled, and the catalyst is protected.

In step S18 subsequent to step S16 and step S17, it is determined whether the condition (0≤second correction coefficient≤1) is satisfied. When affirmative determination is made in step S18, the process proceeds to step S19. In step S19, the second OT increase value is calculated by the expression 5. The second OT increase value corresponds to the corrected increase value.

$$\text{Second OT increase value} = (\text{Second correction coefficient}) \times (\text{First base increase value}) \quad \text{Expression 5}$$

On the other hand, when the second correction coefficient falls outside the range (0≤second correction coefficient≤1) and negative determination is made in step S18, the process proceeds to step S20. In step S20, "1" is set as the second correction coefficient. As a result, the first base increase value is calculated as the second OT increase value. For example, even when an accurate value is not calculated due to a control system of the device, an injection amount of the base increase value is ensured. Thus, the catalyst is protected.

Through the process from step S12 to step S20, calculation of the OT increase value for the center portion of the catalyst 10 has been completed.

Figure 4C:
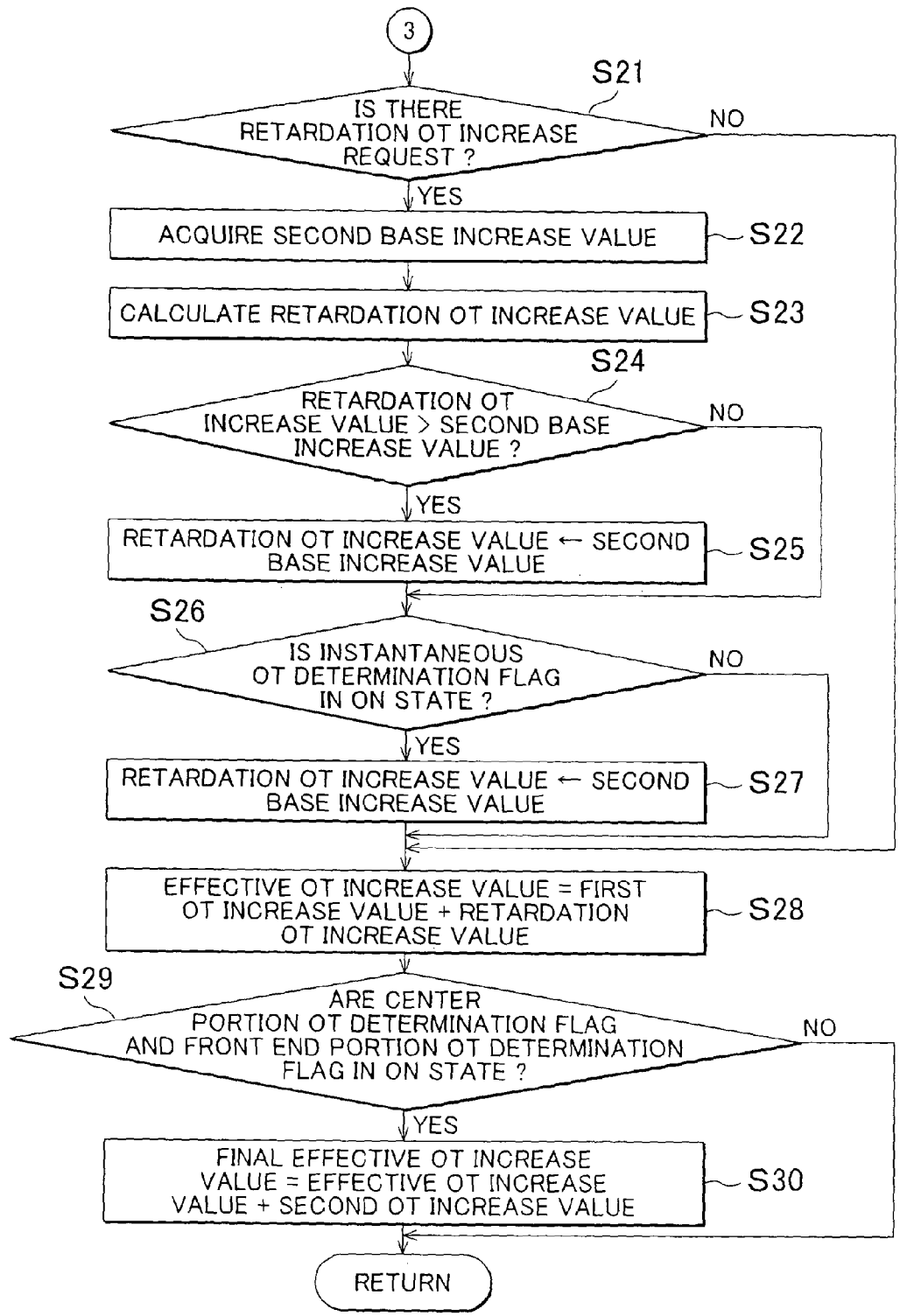
FIG. 4C is a flowchart that shows an example of control over the catalyst protection device according to the embodiment.

Next, the process from step S21 will be described with reference to the flowchart shown in FIG. 4C. Through the process from step S21 to step S28, the OT increase value compatible with retardation control is calculated.

Initially, in step S21, it is determined whether there is a retardation OT increase request. The ECU 2 is able to acquire information about whether control for retarding fuel ignition timing in the engine (hereinafter, referred to as ignition timing retardation control) is being executed. Furthermore, the ECU 2 is able to acquire information about a retardation amount. When the ECU 2 determines that there is a retardation OT increase request on the basis of these pieces of information, the process proceeds to step S22. On the other hand, when there is no retardation OT increase request, the process proceeds to step S28.

In step S22, a second base increase value is acquired. The second base increase value is a retardation base increase value, and is acquired by consulting a map illustrated in FIG. 11. In step S23 subsequent to step S22, the retardation OT increase value is calculated. The retardation OT increase value is calculated by the expression 6. The first correction coefficient is used as the correction coefficient for reducing the second base increase value; instead, another correction coefficient may be used.

Retardation OT increase value=(First correction coefficient)×(Second base increase value)   Expression 6

In step S24, it is determined whether the retardation OT increase value is larger than the second base increase value. When affirmative determination is made in step S24, the process proceeds to step S25. In step S25, the second base increase value is employed as the retardation OT increase value. That is, an allowed maximum value is set for the second base increase value, and the retardation OT increase value is limited by the second base increase value. In other words, the allowed maximum value is obtained as the second base increase value without correcting the second base increase value. After that, the process proceeds to step S26. When negative determination is made in step S24, the process skips step S25 and proceeds to step S26.

In step S26, it is determined whether an instantaneous OT determination flag is in an on state. That is, it is determined whether instantaneous increase determination is made because protection of the catalyst surface is required. For example, this is the case where the retardation amount is large and high temperature of the catalyst surface should be avoided. That is, in step S26, when the retardation amount through retardation control is large, it is determined that protection of the catalyst surface is required, and instantaneous increase determination is made. When affirmative determination is made in step S26, the process proceeds to step S27. In step S27, the second base increase value is employed as the retardation OT increase value. That is, the retardation base increase value is selected, and no correction is made. A reduction measure leads to a reduction in fuel injection amount, so the cooling effect reduces. When instantaneous increase determination is made and the instantaneous OT determination flag is in an on state, the catalyst is cooled by injecting a sufficient amount of fuel. Thus, it is possible to suppress degradation of the catalyst 10. After that, the process proceeds to step S28. On the other hand, when negative determination is made in step S26, the process skips step S27 and proceeds to step S28.

In step S28, an effective OT increase value is obtained by adding the retardation OT increase value to the first OT increase value calculated in step S10. That is, when the internal combustion engine is subjected to ignition timing retardation control, the injection amount increasing unit 26 increases the injection amount including the retardation OT increase value obtained on the basis of the retardation base increase value and the correction coefficient.

In step S29, it is determined whether the center portion OT determination flag is in an on state and the front end portion OT determination flag is in an on state. When affirmative determination is made in step S29, the process proceeds to step S30. In step S30, a final effective OT increase value is obtained by adding the second OT increase value calculated in step S19 to the effective OT increase value calculated in step S28. On the other hand, when negative determination is made in step S29, the process returns. That is, an increase value for the center portion of the catalyst 10 is added to the effective OT increase value only when both the OT determination flag for the center portion and the OT determination flag for the front end portion are in an on state.

The center portion of the catalyst 10 is located downstream of the front end portion in the exhaust gas flow direction. Therefore, when the bed temperature of the front end portion has not reached the OT determination temperature, the bed temperature of the center portion does not increase immediately. An OT increase in such a case results in useless fuel injection, and may influence, for example, a deviation from a range in which the excess air ratio λ=1 at the Stoichiometric air-fuel ratio. Then, an increase value is added only when both the center portion OT determination flag and the front end portion OT determination flag are set.

In this way, the injection amount increasing unit 26 increases the injection amount, by the OT increase value that is calculated for each of the regions into which the catalyst 10 is distributed in the exhaust gas flow direction.

An example of control over the catalyst protection device is described above. The catalyst protection device is able to take various measures on the basis of the operating state of the internal combustion engine and the bed temperature state of the catalyst 10. FIG. 12 is a table that illustrates a correspondence between a state of each OT determination flag and an OT increase measure that may be taken by the catalyst protection device.

In FIG. 12, at (A), the instantaneous OT determination flag, the front end portion OT determination flag and the center portion OT determination flag all are in an on state. In this state, all the measures of retardation OT increase, front end portion OT increase and center portion OT increase are taken. At this time, the base increase value is employed for the retardation OT increase. This is because cooling of the catalyst is given a priority for the reason that the instantaneous OT increase determination flag is in an on state. On the other hand, the corrected increase value is employed for each of the front end portion OT increase and the center portion OT increase. Thus, emissions of HC and CO are suppressed, and deterioration of fuel economy is suppressed.

In FIG. 12, at (B), the instantaneous OT determination flag is in an off state, and the front end portion OT determination flag and the center portion OT determination flag are in an on state. In this state, all the measures of the retardation OT increase, front end portion OT increase and center portion OT increase are taken. At this time, the corrected increase value is employed for the retardation OT increase as in the case of the front end portion OT increase and the center portion OT increase. This is because suppression of deterioration of fuel economy or suppression of emissions of HC and CO is given a priority for the reason that the instantaneous OT increase determination flag is in an off state.

In FIG. 12, at (C), the instantaneous OT determination flag and the front end portion OT determination flag are in an on state; and the center portion OT determination flag is in an off state. In this state, the retardation OT increase and the front end portion OT increase are performed, and the center portion OT increase is not performed. At this time, the base increase value is employed as the retardation OT increase. This is because cooling of the catalyst is given a priority for the reason that the instantaneous OT increase determination flag is in an on state. On the other hand, the corrected increase value is employed for the front end portion OT increase. Thus, emissions of HC and CO are suppressed, and deterioration of fuel economy is suppressed. The reason why the center portion OT increase is not performed is that the center portion OT determination flag is in an off state.

In FIG. 12, at (D), the instantaneous OT determination flag and the center portion OT determination flag are in an off state, and the front end portion OT determination flag is in an on state. In this state, the retardation OT increase and the front end portion OT increase are performed, and the center portion OT increase is not performed. At this time, the corrected increase value is employed for the retardation OT increase as in the case of the front end portion OT increase. This is because suppression of deterioration of fuel economy or suppression of emissions of HC and CO is given a priority for the reason that the instantaneous OT increase determination flag is in an off state. The reason why the center portion OT increase is not performed is that the center portion OT determination flag is in an off state.

In FIG. 12, at (E), the instantaneous OT determination flag and the center portion OT determination flag are in an on state, and the front end portion OT determination flag is in an off state. In this state, the retardation OT increase and the front-end portion OT increase are performed, and the center portion OT increase is not performed. At this time, the base increase value is employed for each of the retardation OT increase and the front end portion OT increase. The reason why the base increase value is employed for the retardation OT increase is that cooling of the catalyst is given a priority for the reason that the instantaneous OT increase determination flag is in an on state. The reason why the base increase value is employed for the front end portion OT increase is that, because a reduction coefficient cannot be calculated when the front end portion OT determination flag is in an off state, safety is considered such that no overheat occurs. The reason why the center portion OT increase is not performed although the center portion OT determination flag is in an on state is as follows. The center portion OT determination temperature is set to a value lower than the front end portion OT determination temperature. Therefore, even when the current bed temperature at the center portion exceeds the center portion OT determination temperature and the center portion OT determination flag is in an on state, it is presumable that it is less likely that the bed temperature at the center portion immediately increases in the case where the front end portion OT determination flag is in an off state. Then, in such a case, the center portion OT increase is not performed. Thus, an excessive fuel rich state at the front end portion and a deviation from a range in which the excess air ratio λ=1 at the Stoichiometric air-fuel ratio are suppressed. In addition, an excessive decrease in bed temperature for the region at the upstream side in the exhaust gas flow direction is suppressed.

In FIG. 12, at (F), the instantaneous OT determination flag is in an on state, and the front end portion OT determination flag and the center portion OT determination flag are in an off state. In this state, the retardation OT increase and the front end portion OT increase are performed, and the center portion OT increase is not performed. At this time, the base increase value is employed for each of the retardation OT increase and the front end portion OT increase. The reason why the base increase value is employed for the retardation OT increase is that cooling of the catalyst is given a priority for the reason that the instantaneous OT increase determination flag is in an on state. The reason why the base increase value is employed for the front end portion OT increase is that, because a reduction coefficient cannot be calculated when the front end portion OT determination flag is in an off state, safety is considered such that no overheat occurs. The reason why the center portion OT increase is not performed is that the center portion OT determination flag is in an off state.

In FIG. 12, at (G), the instantaneous OT determination flag and the front end portion OT determination flag are in an off state, and the center portion OT determination flag is in an on state. In this state, none of the OT increase measures is taken. The reason why the retardation OT increase and the front end portion OT increase are not performed is that the corresponding instantaneous OT determination flag and front end portion OT determination flag are in an off state. The reason why the center portion OT increase is not performed although the center portion OT determination flag is in an on state is the same as described in (E). That is, even when the current bed temperature at the center portion exceeds the center portion OT determination temperature and the center portion OT determination flag is in an on state, it is presumable that it is less likely that the bed temperature at the center portion immediately increases in the case where the front end portion OT determination flag is in an off state. Thus, an excessive fuel rich state at the front end portion and a deviation from a range in which the excess air ratio λ=1 at the Stoichiometric air-fuel ratio are suppressed. In addition, an excessive decrease in bed temperature for the region at the upstream side in the exhaust gas flow direction is suppressed.

The embodiment of the invention is described in detail above; however, the invention is not limited to the above example embodiment. Various alterations or modifications are applicable within the scope of the invention recited in the appended claims.

The invention claimed is:

1. A catalyst protection device for an internal combustion engine, comprising:
   a catalyst that is provided in an exhaust system of the internal combustion engine and that purifies exhaust gas;
   a bed temperature acquisition unit configured to acquire a current bed temperature of the catalyst; and
   an injection amount increasing unit configured to increase an amount of fuel injected in the internal combustion engine when the current bed temperature approaches a predetermined determination value, wherein
   the injection amount increasing unit is configured to increase the amount of injected fuel, by a first increase value that is obtained on the basis of (i) a first base increase value which is obtained on the basis of the operating state of the internal combustion engine, and (ii) a correction coefficient which is obtained on the basis of the current bed temperature and a target bed temperature lower than the predetermined determination value so that a temperature of the bed does not rise above the predetermined determination value during the increase of the amount of fuel injected in the internal combustion engine.

2. The catalyst protection device according to claim 1, wherein the injection amount increasing unit is further configured to increase the amount of injected fuel, by further calculating a sum of (i) the first increase value and (ii) a second increase value that is obtained on the basis of the correction coefficient and a second base increase value that is obtained on the basis of a retardation amount through a retardation control.

3. The catalyst protection device according to claim 2, wherein the injection amount increasing unit is further configured to select the second base increase value as the second increase value when it is determined that protection of the catalyst is required and when the injection amount increasing unit increases the amount of injected fuel by further calculating a sum of the first increase value and the second increase value.

4. The catalyst protection device according to claim 1, wherein
the target bed temperature is a bed temperature to which the bed temperature converges at the time when an increase in the amount of injected fuel by the first base increase value is continued.

5. The catalyst protection device according to claim 1, further comprising:
a steady bed temperature acquisition unit configured to acquire a steady bed temperature that is a temperature of the catalyst in the case where an operating state of the internal combustion engine is a steady state,
wherein
the correction coefficient is a ratio of a difference between the current bed temperature and the target bed temperature to a difference between the steady bed temperature and the target bed temperature.

6. The catalyst protection device according to claim 1, wherein the first increase value is calculated for each of a plurality of regions of the catalyst in the exhaust gas flow direction, and
wherein the injection amount increasing unit is configured to increase the amount of injected fuel based on the first increase values which are calculated for each of the plurality of regions of the catalyst.

7. The catalyst protection device according to claim 6, wherein the injection amount increasing unit is further configured to add an increase value for a preset reference region to an increase value for a region upstream of the reference region in the exhaust gas flow direction on the basis of determination as to whether an increase in fuel injection amount is required for the preset reference region and determination as to whether an increase in fuel injection amount is required for the region upstream of the reference region in the exhaust gas flow direction among the plurality of regions.

8. The catalyst protection device according to claim 6, wherein the injection amount increasing unit is further configured to add an increase value for a preset reference region to an increase value for an adjacent region upstream of the reference region in the exhaust gas flow direction when it is determined that an increase in fuel injection amount is required for both the preset reference region and the adjacent region upstream of the reference region in the exhaust gas flow direction among the plurality of regions.

9. The catalyst protection device according to claim 6, wherein the bed temperature acquisition unit is further configured to set a determination value for each of the plurality of regions and then to calculates an increase value for a preset reference region among the plurality of regions and an increase value for a region upstream of the reference region in the exhaust gas flow direction among the plurality of regions, based on the determination values respectively set for the regions, and
wherein the bed temperature acquisition unit is further configured to acquire the bed temperature in the reference region on the basis of the determination value set for the region upstream of the reference region in the exhaust gas flow direction.

10. The catalyst protection device according to claim 6, wherein
the injection amount increasing unit is further configured to set a value, as a determination value for the reference region, smaller than a determination value set for a region upstream of a preset reference region, which is one of the plurality of regions, in the exhaust gas flow direction, and is further configured to determine for each region whether an increase in fuel injection amount is required by comparing a current bed temperature for each of the regions with the determination value set for each of the regions.

11. A catalyst protection method for an internal combustion engine, comprising:
acquiring a current bed temperature of a catalyst;
determining whether the current bed temperature exceeds a predetermined determination value, and
increasing an amount of injected fuel, by an increase value that is obtained on the basis of (i) a base increase value, which is obtained on the basis of the operating state of the internal combustion engine, and (ii) a correction coefficient, which is obtained on the basis of the current bed temperature and a target bed temperature lower than the predetermined determination value so that a temperature of the bed does not rise above the predetermined determination value during the increase of the amount of fuel infected in the internal combustion engine.

12. A catalyst protection device for an internal combustion engine, comprising:
a catalyst that is provided in an exhaust system of the internal combustion engine and that purifies exhaust gas;
a bed temperature acquisition unit configured to acquire a current bed temperature of the catalyst;
an injection amount increasing unit configured to increase an amount of fuel injected in the internal combustion engine when the current bed temperature exceeds a predetermined determination value, wherein the injection amount increasing unit is configured to increase the amount of injected fuel, by a first increase value that is obtained on the basis of (i) a first base increase value which is obtained on the basis of the operating state of the internal combustion engine, and (ii) a correction coefficient which is obtained on the basis of the current bed temperature and a target bed temperature lower than the predetermined determination value so that a temperature of the bed does not rise above the predetermined determination value during the increase of the amount of fuel injected in the internal combustion engine; and
a steady bed temperature acquisition unit configured to acquire a steady bed temperature that is a temperature of the catalyst in the case where an operating state of the internal combustion engine is a steady state,
wherein the correction coefficient is a ratio of a difference between the current bed temperature and the target bed temperature to a difference between the steady bed temperature and the target bed temperature.

* * * * *